United States Patent

[11] 3,559,708

| [72] | Inventor | Richard L. Cook<br>Flagstaff, Ariz. |
|---|---|---|
| [21] | Appl. No. | 775,365 |
| [22] | Filed | Nov. 13, 1968 |
| [45] | Patented | Feb. 2, 1971 |
| [73] | Assignee | The Goodyear Tire & Rubber Company<br>Akron, Ohio<br>a corporation of Ohio |

[54] IMPACT-RESISTANT CONTAINER AND METHOD OF MAKING SAME
9 Claims, 15 Drawing Figs.

[52] U.S. Cl. .................................................. 150/1
[51] Int. Cl. .................................................. B65d 37/00,
B65d 31/10
[50] Field of Search ........................................ 150/.5, 1;
229/EB; 220/63; 280/5

[56] References Cited
UNITED STATES PATENTS

| 2,430,905 | 11/1947 | Bradley | 150/0.5 |
| 2,508,906 | 5/1950 | Cunningham | 150/0.5X |
| 3,117,606 | 1/1964 | Hastings | 150/1 |
| 3,305,160 | 2/1967 | Lehman | 229/EBUX |
| 3,426,937 | 1/1969 | Boschi | 220/63 |
| 3,433,353 | 3/1969 | Keillor | 150/1X |

Primary Examiner—George E. Lowrance
Attorneys—F. W. Brunner and Paul E. Milliken ABSTRACT: An impact-resistant container having a flexible walled, rupture resistant, fluid impervious body portion in which one or more pleats are formed. The pleats are secured in a folded position by use of an adhesive or by sewing or interweaving the pleated portion with threads or fibers of sufficient strength to hold the pleats in a folded position during normal use of the container as a vehicle fuel tank or for carrying other liquid substances. Upon being subjected to high impact loads, the folded pleats unfold to increase the volume of the container and while unfolding, absorb the energy of impact upon the container to prevent its bursting. This invention is particularly useful in preventing rupture of fuel tanks in airplane or automotive vehicles and greatly reduces the likelihood of fires which result from such ruptured fuel tanks, air droppable containers and any tank or container where high impact loads will be applied. When used as a fuel tank, the container of this invention may be mounted in a vehicle in a breakaway type retainer shell which holds the tank in a folded position during normal use but upon impact, will open up to permit the fuel tank to expand and unfold to absorb the energy of impact.

PATENTED FEB 2 1971

INVENTOR.
RICHARD L. COOK
BY
*Milliken*
ATTORNEY

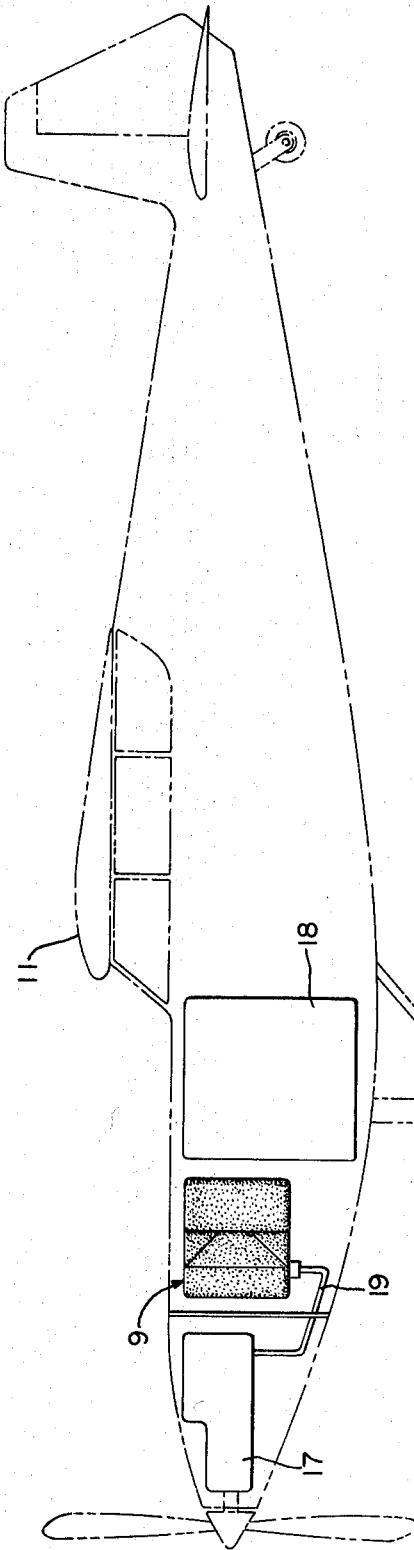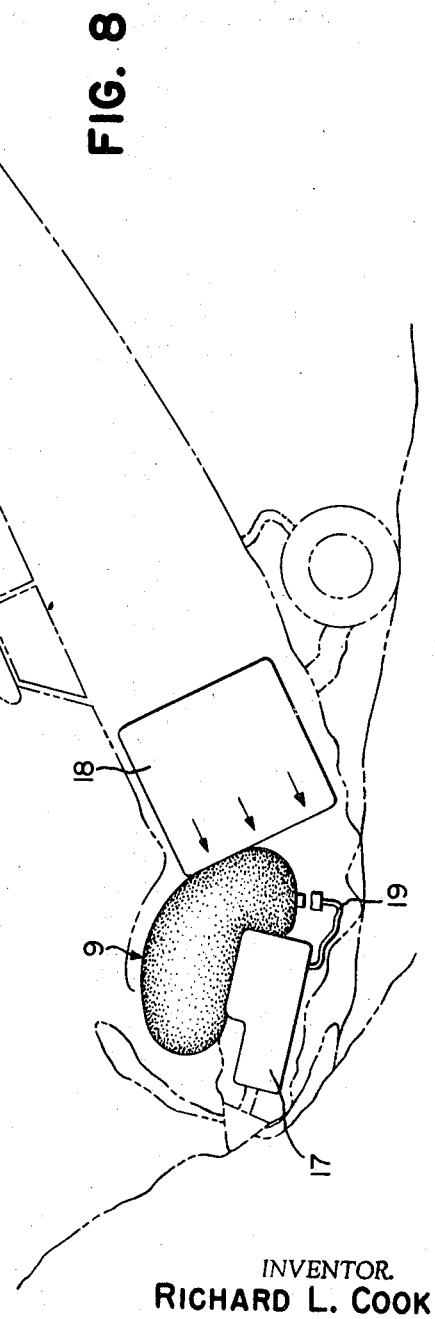

INVENTOR.
RICHARD L. COOK

BY

ATTORNEY

IMPACT-RESISTANT CONTAINER AND METHOD OF MAKING SAME

This invention relates to an impact-resistant container which is a particularly useful as a rupture-proof, crash-resistant fuel tank, air droppable container, tank or cell where high stress loads may be applied.

BACKGROUND OF THE INVENTION

In the past, much thought has been given to the problem of building fuel tanks and other containers which are rupture proof when subjected to high-impact loads such as may be encountered in a plane crash, automobile accident or when containers are dropped by parachute or permitted to free fall from an airplane. In most instances, the problem was approached from the standpoint of strengthening the walls of the container, but making it of sufficient resiliency to permit to stretch and thereby absorb the shock of the impact. Another approach was to produce a double wall container in which the inner wall would rupture, but the fluid would be retained by the outer wall of the container. The shock of impact would be absorbed by the bursting of the inner wall which would, to some degree, reduce the internal pressure of the fluid against the outer wall of the container. A typical example of these two approaches may be seen in U.S. Pat. No. 2,991,815 issued to P. O. Pfeiffer and U.S. Pat. No. 3,009,566 issued to R. L. Oakley. Both of the containers illustrated in these two patents are used for aerial delivery of liquid substances such as fuel. While some of the prior art devices may have been suitable in certain applications, they have not always been entirely satisfactory and they have often been unduly cumbersome, expensive to build, or undesirable for other reasons. Many of these prior devices would not be suitable, for example, as vehicle fuel tanks since they might prove to be too bulky and take up valuable space in the vehicle which is needed for other purposes.

OBJECTS OF THE INVENTION

It is the primary object of this invention to provide a high impact resistant container which is simple to produce, easy to install and which occupies a minimum amount of space during shipment.

Another object of this invention is to provide a container, the general construction of which may be applicable to use in carrying many different types of liquids.

These and other objects of the invention will become more fully apparent as the description proceeds in the following specification and the appended drawings.

BRIEF DESCRIPTION OF THE DRAWINGS

FIG. 7 is a simplified side elevational view of an airplane containing a fuel tank of the type shown in FIG. 4;

FIG. 8 shows the airplane illustrated in FIG. 7 at the moment of impact during a crash with the fuel tank displaced from its normal position and the pleats unfolded to absorb the shock of the impact;

DESCRIPTION OF THE PREFERRED EMBODIMENTS

Figure 1:
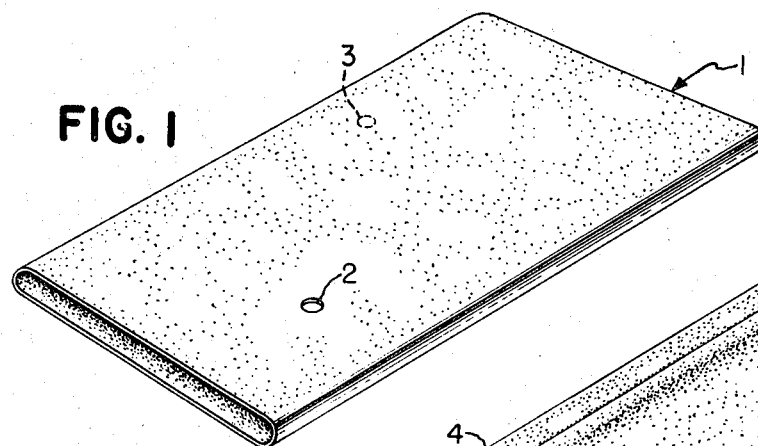
FIG. 1 is a perspective view showing a piece of tubular material for producing a fuel tank in accordance with one embodiment of the invention.

Referring now to FIG. 1 of the drawings, a basic open ended tubular member is indicated by the numeral 1. The tubular member 1 is made of a flexible rupture resistant, fluid impervious material. Various materials may be used so long as they have the desired physical properties needed for the particular purpose for which the container is to be used. The tubular member 1 may be reinforced with fibers or fabric and it may consist of plastic or elastomeric materials. The tubular member 1 may have one or more inlet apertures 2 and one or more apertures 3 cut therein prior to performing further work upon the tube 1 in the construction of a fuel tank.

Figure 2:
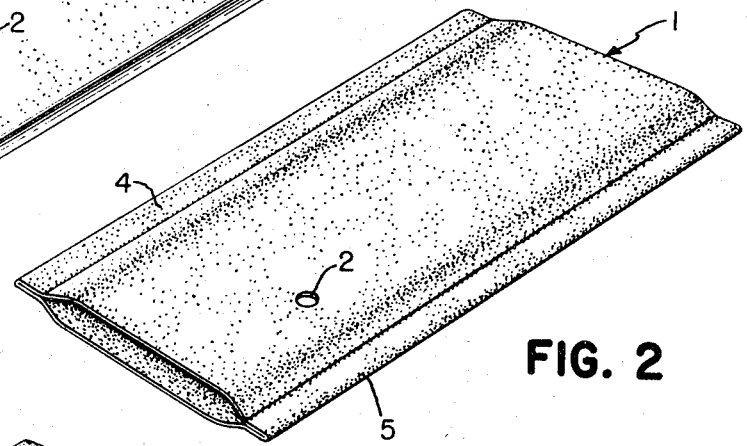
FIG. 2 shows a perspective view of the tube shown in FIG. 1 with pleats bonded on each side thereof.
Figure 3:
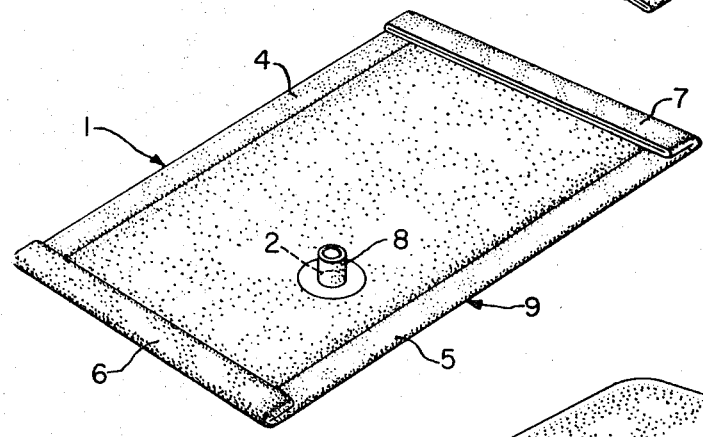
FIG. 3 is a perspective view of the tube shown in FIG. 1 with the ends lap bonded as a further step in the production of a fuel tank.
Figure 4:
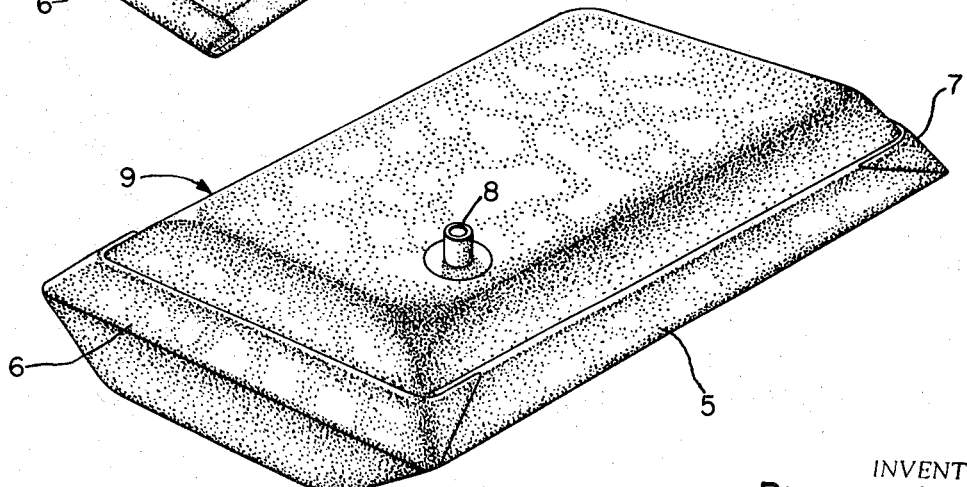
FIG. 4 is a perspective view of a completed fuel tank made in accordance with the steps illustrated in FIGS. 1 through 3.

Referring now to FIG. 2, the tube 1 is shown as having longitudinal pleats 4 and 5 along each side thereof. The pleats 4 and 5 are formed by spreading a strip of adhesive longitudinally along the inside of the tube at two oppositely spaced locations around the circumference of the tube. The pleats 4 and 5 are then folded in the areas where the adhesive has been applied. In a similar manner, adhesive is applied along each end of the tube and the ends are folded over to form lap seams 6 and 7, as shown in FIG. 3, to seal off the ends of the tube. To complete the construction of the fuel tank, an inlet fitting 8 may be attached to the inlet aperture 2, and a suitable outlet fitting (not shown) may be attached to the outlet aperture 3. The completed fuel tank now designated by the numeral 9, shown in FIG. 3, may be left in this flattened flattened condition for shipment to its place of use. A flat tank of this type will require very little shipping space. When the tank 9 is ready for use, it may be expanded out, as shown in FIG. 4, with the pleats 4 and 5 folded flat against the sides of the tank and any projecting portion of the lap end seams 6 and 7 may be folded flat against the ends of the tank. The tank 9, as shown in FIG. 4, may now be inserted either in an automotive vehicle 10, as shown in FIG. 5, or in an airplane 11, as shown in FIG. 7.

Figure 5:
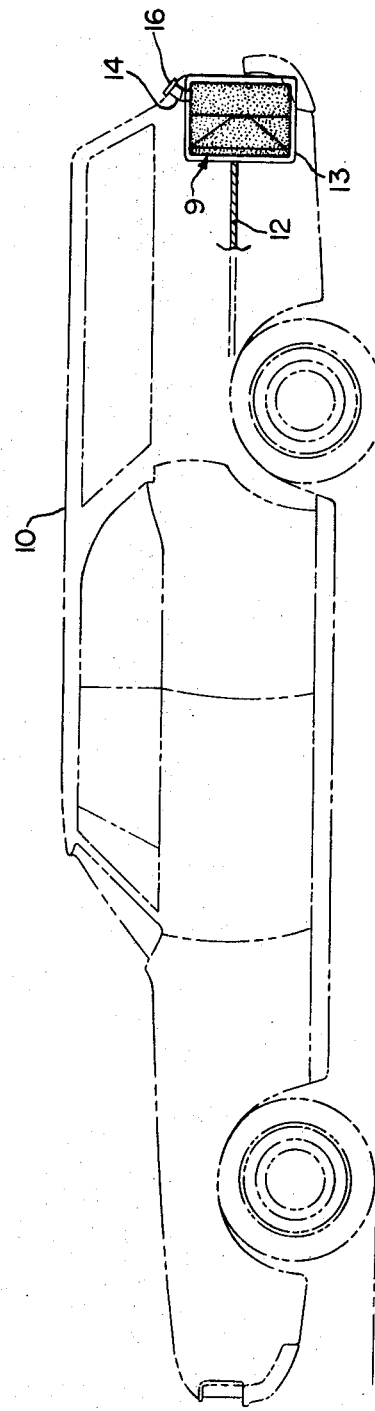
FIG. 5 is a simplified side elevational view of an automotive vehicle utilizing the fuel tank shown in FIG. 4.

Referring now to FIG. 5, the tank 9 is shown mounted in a station wagon 10. The tank 9 is mounted at the rear of the station wagon 10 with half of the tank lying above the rear deck 12, and the other half of the tank lying below. The tank 9 is surrounded by a breakaway retainer shell 13 which is fastened to the station wagon 10 with sufficient strength to carry the tank 9 in a folded position during normal use. A breakaway filler or inlet fitting 14 is provided for filling the fuel tank.

Figure 6:
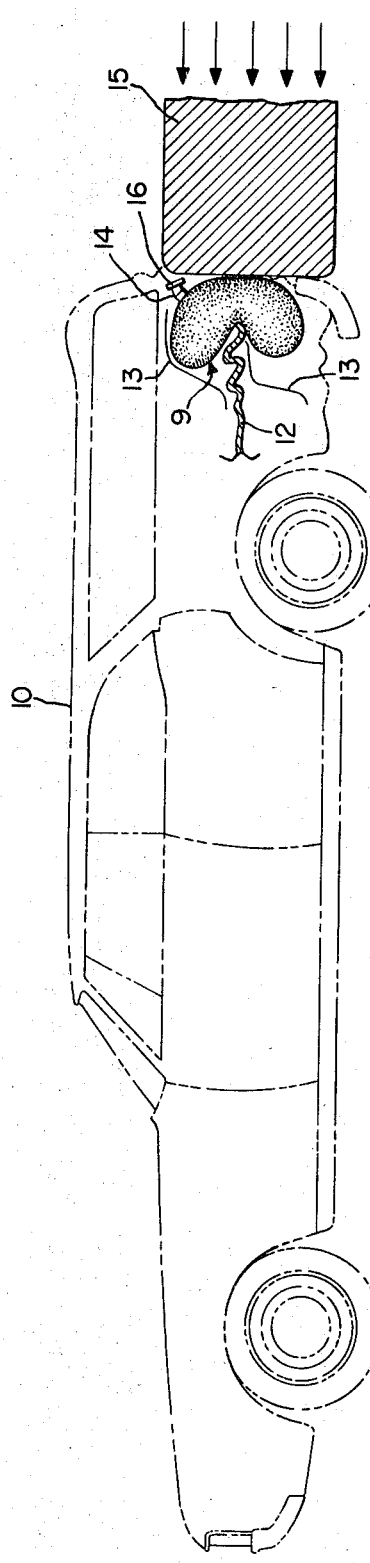
FIG. 6 is a view of the vehicle shown in FIG. 5 showing the effect upon the fuel tank of an impacting mass hitting the vehicle.

In FIG. 6, an impacting mass 15 is shown striking the rear of the station wagon 10. As illustrated by the drawing, the force of impact causes the fitting 14 to break away from the body of the station wagon with the filler cap 16 remaining intact upon the fitting to prevent loss of fuel from the tank 9. The retainer shell 13 separates from the body of the station wagon 10 permitting the pleats of the fuel tank 9 to unfold thereby enlarging the capacity of the fuel tank and while unfolding, to absorb some of the shock of impact. The retainer shell 13 may be held in position either by resilient fasteners or frangible bolts or rivets which will break to permit separation of the retainer shell 13 from the vehicle body. The fuel tank 9, instead of bursting, will merely enlarge and be displaced into whatever area is available to it within the vehicle 10. As may be seen in FIG. 6, the tank 9 will tend to fold around the rear deck 12. A similar action occurs when the fuel tank 9 is used in the airplane 11 shown in FIG. 7. The airplane 11 used in this particular situation is a crop duster. The fuel tank 9 is positioned between the engine 17 and a chemical hopper 18 for carrying the crop dusting chemicals. A breakaway type fuel line 19 connects the fuel tank 9 with the engine 17. Upon impact of a crash, as shown in FIG. 8, the fuel tank 9, instead of bursting upon impact of the hopper 18 driving it against the engine 17, is displaced through the fuselage and the pleats of the tank 9 unfold in a manner similar to that previously described regarding the station wagon 10. It may be seen that there are various ways of making the expansion pleats for impact-resistant fuel tanks and for other containers. The type of pleat made will depend upon the type of container in which it is to be used and upon the type of impact forces which it is expected to encounter. The strength of the pleat may, of course, be controlled by the type of adhesive used. Some particular containers may require stronger pleats than others.

Figure 9:
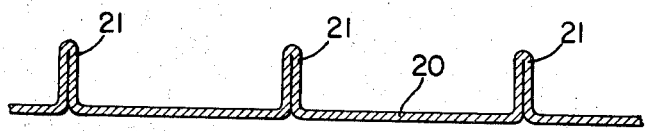
FIG. 9 is a fragmentary cross-sectional view through the wall of a fuel cell showing a series of pleats bonded in a folded position by adhesive.

In I FIG. 9, a fuel tank wall 20 has a plurality of pleats 21 bonded together in a folded position by an adhesive.

Figure 10:
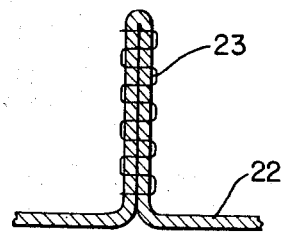
FIG. 10 is a fragmentary cross-sectional view of another embodiment of the invention showing a pleat stitched and bonded in a folded position.
Figure 11:
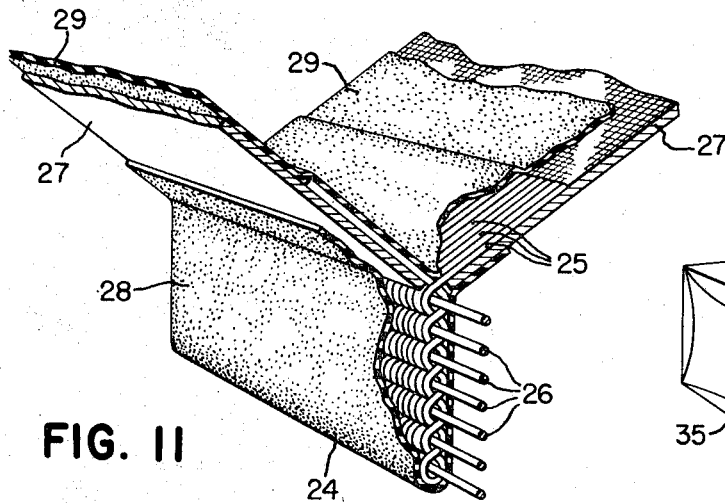
FIG. 11 is a fragmentary perspective view for a woven pleat bonded into the walls of fuel cell.

In FIG. 10, a fuel tank wall 22 is shown having a pleat 23 which is fastened in a folded position both by an adhesive and by stitching through the pleat. Another type of fold-out pleat is shown in FIG. 11 in which a pleat 24 is formed of interwoven warp fibers or cords 25 and weft fibers or cords 26, with the weft fibers running longitudinally of the pleat 24 and having less strength than the warp fibers 25. Upon impact, the weaker weft fibers will break before the warp fibers 25 and thereby will permit the pleat to unfold. The pleat 24 is made separately from the rest of the fuel tank and is bonded to the fuel tank wall indicated by the numeral 27 by a suitable adhesive. A nonporous cover 28 is applied over the fuel tank wall 27 and the pleat 24. An inner lining 29 of fluid impervious material is applied to cover both the fuel tank wall 27 and the pleat 24 to prevent loss of fuel through the pleat.

Figure 12:
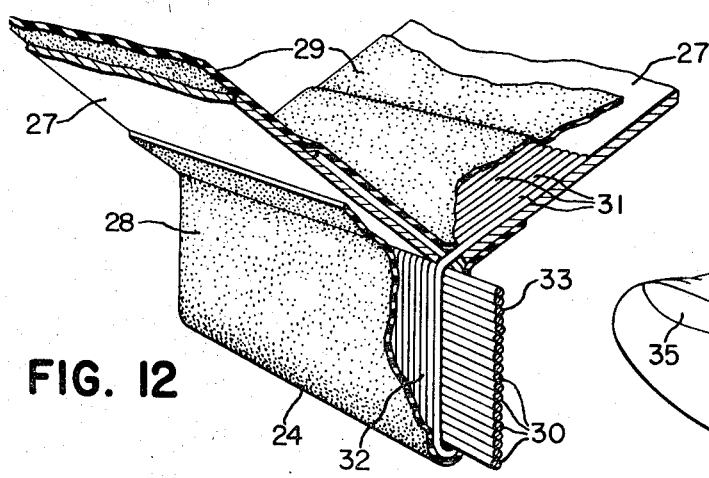
FIG. 12 is a fragmentary perspective view of a modification of the pleat shown in FIG. 11.

The embodiment shown if FIG. 12 is similar to the embodiment shown in FIG. 11 but differs in that the weft fibers 30 are not interwoven with the warp fibers 31. The warp fibers 31 are formed into elongated loops 32 through which a flat layer 33 of the weft fibers 30 are passed. The rest of the structure of the pleat and the manner in which it is attached to the fuel tank is the same as that in the embodiments shown in FIG. 11. The weft fibers 30 are weaker than the warp fibers 31 and in a manner similar to that previously described, will break to permit unfolding of the pleat when an impact occurs.

Figure 13:
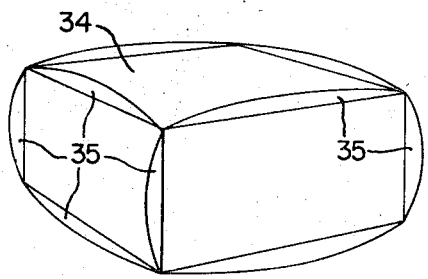
FIG. 13 shows a perspective view of a fuel tank with a pleat of the type shown in FIG. 11 or 12 with the pleats extending outwardly from the corners of the tank.

In FIG. 13, a typical fuel tank 34 is shown having pleats 35 extending from all the corners of the tank. It will be understood that additional pleats may be positioned at various locations throughout the tank to assist in the expansion of the tank upon impact.

Figure 14:
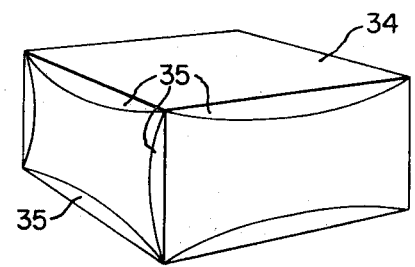
FIG. 14 shows the same tank as that shown in FIG. 13 but with the pleats laid flat against the walls of the tank.

FIG. 14 shows the tank 34 with the pleats 35 folded flat against the tank for inserting it in a vehicle.

Figure 15:
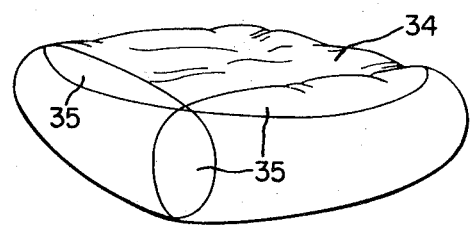
FIG. 15 shows the same tank as that shown in FIGS. 13 and 14 but with the pleats fully unfolded after the tank has received an impact.

In FIG. 15, the fuel tank 34 is shown after having been subjected to an impact which has unfolded the pleats and expanded the capacity of the tank. It will be understood that various minor modifications in the manner of fastening the pleats in a folded position and in attaching the pleats to the walls of a container with which they are used may be resorted to without departing from the scope of the invention.

It will also be understood that this invention is not limited only to fuel tanks but the same principle may be applied to any type of container for carrying a liquid which is likely to be subjected to high impact forces. The various types of application for which each container will be used will necessarily determine the strength required of the pleats and of the container as a whole.

Various other modifications may be resorted to without departing from the scope of the invention.

I claim:

1. An impact impact-resistant container comprising:
   a. a flexible walled rupture-resistant, fluid-impervious body portion;
   b. an integral pleated portion formed in the body portion;
   c. fibrous means securing pleated portion in a folded position;
   d. said fibrous securing means being of sufficient strength to retain the pleated portion in the folded position during normal use of the container when filled with its intended contents but adapted to break and permit the pleated portion to unfold when the container is subjected to high impact forces.

2. An impact-resistant container as claimed in Claim 1 wherein the pleats are folded flat against the outside of the walls of the body portion and the entire body portion is enclosed within a retainer shell, said body portion being releasable from said shell upon receiving high impact forces, the energy of such impact forces being absorbed by the unfolding of the pleats in said body portion when it is released from the shell.

3. An impact-resistant container as claimed in claim 1 wherein the body portion is a fuel tank and breakaway fittings ate provided to attach the tank to the vehicle in which it is used and to attach fuel lines to the tank.

4. An impact-resistant container as claimed in claim 1 wherein the pleated portion is secured in the folded position by stitches.

5. An impact-resistant container as claimed in claim 1 wherein the pleated portion is secured in the folded position by a plurality of weft fibers running longitudinally of the pleat, the strength of said fibers being less than the warp fibers with which they are used thereby permitting failure of the weft fibers prior to failure of the weft fibers to permit unfolding of the pleats when the container is subject to high impact forces.

6. An impact-resistant container as claimed in Claim 5 wherein the warp and weft fibers are interwoven.

7. An impact-resistant container as claimed in Claim 5 wherein the weft fibers lie in parallel relationship to each other within a loop formed by each of the warp fibers.

8. An impact-resistant container as claimed in Claim 5 wherein the warp fibers are bonded to the wall of the body portion.

9. An impact-resistant container as claimed i in Claim 1 wherein part of the pleats of the pleated portion are of high strength and part are of low strength.